Jan. 22, 1963   R. E. COX ETAL   3,074,423
FILLING SYSTEM INCLUDING FILLING AND RELIEF VALVES
Filed Nov. 25, 1959

INVENTORS
RICHARD E. COX
ARTHUR J. CAVANAUGH
BY H. Vincent Harsha
ATTORNEY

United States Patent Office 3,074,423
Patented Jan. 22, 1963

3,074,423
FILLING SYSTEM INCLUDING FILLING
AND RELIEF VALVES
Ralph E. Cox, Natick, and Arthur J. Cavanaugh, Sudbury, Mass., assignors to Raytheon Company, Lexington, Mass., a corporation of Delaware
Filed Nov. 25, 1959, Ser. No. 855,398
2 Claims. (Cl. 137—205)

This invention relates to coupling valves and more particularly to a filling and pressure relief valve capable of maintaining a vacuum tight coupling between a container and an evacuating and filling assembly for the container.

Applications in which it is desirable to evacuate a container prior to charging it with a particular fluid, such as, for example, a container for a high voltage power supply or filter network, it is difficult to evacuate and then fill the container with oil or other dielectric fluid without breaking the vacuum seal in connecting an oil filling hose to the container. This is particularly true after the filling process, when it is desirable to insert a pressure relief valve in the filler hole which was utilized to evacuate and fill the container. For example, when the container is filled with oil, it becomes necessary to remove the filler assembly hose directly from the container and insert a pressure relief valve in the threaded filler hole. However, when the filler assembly hose is removed from the container, oil usually escapes from the filler hose and from the container. In addition, air normally present in an unused relief valve works its way into the container. Even attempts to fill the pressure relief valve with oil and then rapidly insert it into the threaded filler hose results in air bubbles becoming trapped in the container.

It is therefore an object of this invention to provide a vacuum type filling and relief valve which performs the dual operation of evacuating the container, filling the container with a desired fluid while permitting substantially no air to enter the container, and then sealing the container with a pressure sensitive relief valve.

In accordance with the filling and relief valve of the invention, a valve casing is threaded at both ends or otherwise provided with means for connecting to a container to be filled and to a hose or filling assembly. A tubular sleeve is slidably supported and spring loaded within the casing and is provided with a tapered seat portion which contacts an inner portion of the filling hose connector. A valve head provided with a valve stem is slidably mounted within the sleeve to form a concentric fluid duct. The valve head is urged by spring pressure into sealing contact with the sleeve. The valve head moves in and out of contact with the sleeve to provide a pressure relief outlet independently of the filling and evacuating valve action which is performed in connection with the slidable sleeve. When the threaded end of the valve casing is inserted into the hose connector for attachment thereto, the inner concentric portion of the connector bears upon the tapered seat portion of the sleeve to provide an air-tight seal. As the connector is tightened, the spring-loaded sleeve is depressed and the valve head by spring action remains in sealing contact with the sleeve for a portion of the travel of the sleeve, thus, insuring that an air-tight seal is maintained between the hose connector and the tapered seat portion of the sleeve. However, as the sleeve is depressed a greater distance, the sealing contact between the valve head and sleeve is broken and provides an opening from the fluid duct in the tubular sleeve to the filling hose connector. In like manner, when the hose connector is removed from the threaded valve casing, the outlet from the tubular sleeve to the filling hose is slidably closed prior to the breaking of the hose connector with the slidable sleeve. Thus, an air-tight seal of the hose connector and sleeve is achieved prior to the opening or closing of the outlet to the filling hose so that air is prevented from entering the filling hose whenever the coupling connector is maintained in a compressed condition.

The feature of the novel coupling valve together with its manner of construction will be more readily apprehended by reference to the following description, when considered in conjunction with the attached drawing in which.

Figures 1, 2, 3, 4, 5:
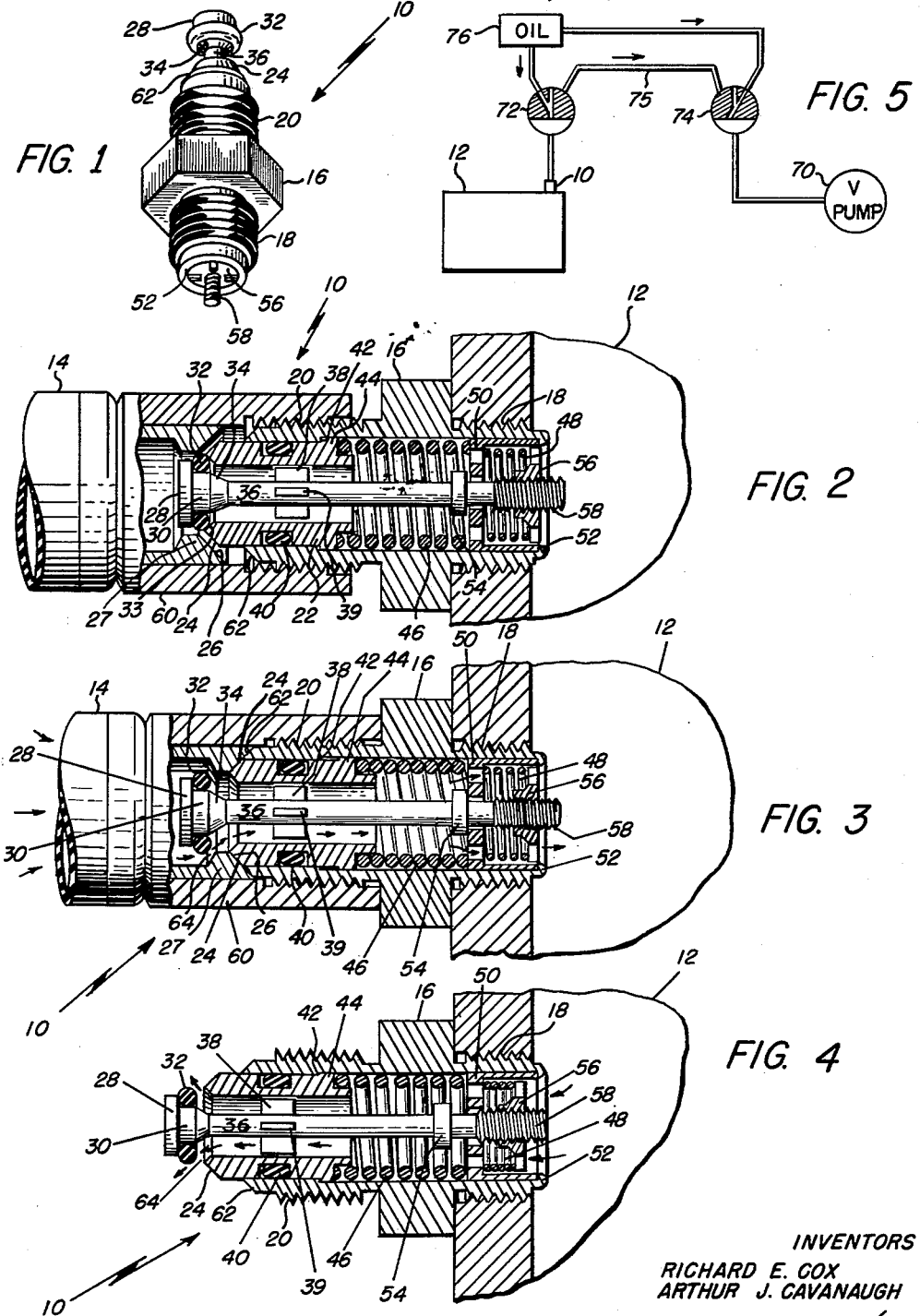
FIG. 1 is an isometric view of the filling and relief valve.
FIG. 2 is a cross-sectional view of the relief valve in the closed position inserted in a container.
FIG. 3 is a cross-sectional view of the relief valve in the open position.
FIG. 4 is a cross-sectional view of the valve in the position permitting pressure to escape from the container.
FIG. 5 is a block diagram of the valve used in connection with filling and evacuation apparatus for a container.

Referring to FIG. 1, the filling and relief valve of the present invention may be cylindrical or have other suitable cross section as long as the elements of the device may be telescoped with reference to each other. Referring in particular to FIGS. 1 and 2, a filling and relief valve 10 is shown connected to a container 12 and a filling and evacuating hose 14. The filling and relief valve 10 comprises a valve casing 16 and two threaded sections 18 and 20 for connecting the valve to the container and to the filling hose, respectively. A sleeve 22 is slidably mounted within the valve casing and provided with a tapered seat portion 24 which contacts a face 26 on the inner portion 27 of filling hose 14. A valve head 28 is provided with a valve stem 30 which supports a resilient O ring 32 for establishing a vacuum seal with the inner tapered seat portion 33 of sleeve 22. The valve stem is tapered at 34 to a smaller diameter stem 36 in order to provide a concentric passage communicating with the container and filling hose 14. The stem is centered within the sleeve 22 by transverse radial vanes 38 and 39. The sleeve is sealed from the body or valve casing 16 by means of a second O ring seal 40 positioned in a groove in the sleeve 22. The sleeve has a slightly larger diameter at 44 to bear against a shoulder 42 in the valve casing 16 and, thus, retain the sleeve within the valve casing 16 during pressure of a loading spring 46. The stem and valve head are urged by means of a second loading spring 48 in an axial direction toward the container by means of a flange 50 which is slidably inserted into the end of the valve casing and is spun over at 52 to retain the flange in the valve casing when subject to the pressure action of loading spring 46. Thus, the valve head 28 is urged in an axial direction and into sealed contact with the inner tapered seat portion 33 of the sleeve. When the sleeve is depressed, as shown in FIG. 3, a shoulder portion of the stem 54 contacts the base or flange 50 to limit the traveling of the valve head in an axial direction. However, the spring 46 exerts a greater pressure on the sleeve 22 than does spring 48 and normally maintains the shoulder 54 of the stem out of contact with the flange 50, as shown in FIG. 2. Thus, in the absence of a connector exerting axial pressure upon the outer tapered seat portion 24 of sleeve 22, the axial pressure of the valve head on the O ring 32 provides a vacuum-tight seal. An adjusting nut 56 is rotatably attached to the threaded end portion 58 of the valve stem in order to vary the force of spring 48 upon the valve stem 46, and thus, control the relief valve pressure point.

When sleeve 22 is fully compressed against shoulder 42 by means of spring 46, the valve head 28 and O ring 32 acts as a poppet or relief valve to permit pressure from within the container to escape by axially pushing valve 28 out of engagement with the tapered end portion 33 of sleeve 22. In this manner, the valve head moves in and out of contact with the sleeve to provide a pressure relief outlet independently of the filling and evacuating valve action which, as noted, it performed in connection with the slidable sleeve.

In operation, therefore, the threaded end of a connecting hose 14 is rotatably connected to the threaded end of the valve casing 20. The inner concentric portion 27 of the hose connector 60 bears first upon the tapered seat portion 24 of the sleeve to provide an air-tight seal. As the connector is tightened, the spring-loaded sleeve is depressed against the loading spring 46 which, in turn, is depressed and travels inwardly so that the tapered seat portion of the sleeve becomes aligned with the tapered shoulder portion 62 of the valve casing 22. Since the travel of the sleeve is greater than the travel permitted by the stem, the O ring seal, as shown in FIG. 3, is broken at 64 to form an outlet. This outlet permits evacuation of the air from the container and the insertion of oil into the container. At the same time, sealing pressure is applied at the tapered seat portion of the sleeve to prevent air from entering the container during the filling process. In like manner, when the filling hose is disconnected from the valve casing, spring 46 urges the sleeve back into sealing contact with the valve head before the filling line is broken, thus preventing loss of fluid from the container. When the evacuation and filling process is completed, the valve, as noted, operates as an adjustable relief device. An excess of pressure in the container applies pressure to the seat of valve head 28 and compresses the relief valve spring 48. This action breaks the seal of the O ring on the sleeve and permits the excess pressure to escape through outlet formed at 64 as shown in FIG. 4.

The axial pressure of the valve head on the sleeve is adjusted by spacer nut 56 to compress the relief valve spring and to adjust the pressure of the valve head against the sleeve to prevent oil from escaping from the container until the pressure reaches a predetermined level. Turning the adjustment or spacer nut 56 inwardly exerts greater pressure on the seat portion of the valve head.

Referring now to FIG. 5, there is shown apparatus for filling and evacuating the container 12. In operation, air is first pumped out of the container 12 by a vacuum pump 70. The three-way valves 72 and 74 are set so that vacuum is applied to hose line 75. In this manner, container 12 is directly evacuated to the desired pressure. The three-way valve 74 is then turned to the position shown in FIG. 5 and vacuum is applied to the oil in reservoir 76. When air bubbles have been removed from the oil, valve 72 is turned to the position as shown in FIG. 5 which permits oil to enter the evacuated container 12 through the valve 10. When the container 12 is filled, the filling hose can be removed from the valve 10 and the container is sealed off by the closing of the sleeve into contact with the O ring before the filling hose connector breaks its connection with the tapered portion 24 of the sleeve. In this manner, the valve seals off the container and its contents before the connection to the filler line is broken, thus, preventing loss of fluid from the container or inclusion of air during the disconnecting process. A protective cover, not shown, can then be connected to the valve casing by means of threads 20. The valve then performs as a preadjusted pressure relief valve.

It is to be understood that the above-described arrangements are illustrative of the application of the principles of the invention. Numerous other arrangements may be devised by those skilled in the art without departing from the spirit and scope of the invention. Accordingly, it is desired that the invention not be limited to the particular details of the embodiments disclosed herein except as defined in the appended claims.

What is claimed is:

1. In combination, a filling and relief valve comprising a valve casing having threaded outer end portions, a concentric sleeve slidably supported in said casing, a valve stem and valve head integral therewith axially moveable in a valve opening and closing direction, means urging said valve head into sealing contact with said sleeve, means for limiting the travel of said valve stem to a distance shorter than the travel of said sleeve, a filling hose having a connector adapted to threadably engage said valve casing, said connector having an inner abutment adapted to seat against the end of said sleeve adjacent to said valve head to urge said sleeve out of sealing contact with said valve head when said connector is in threaded engagement with one end of said threaded valve casing, a container to be evacuated connected to the other end of said valve casing, said filling hose connected to a three way valve, two hose lines connected to said three-way valve, one of said hose lines connected to a fluid reservoir, the other said hose line connected to a second three-way valve, a third hose line connected to said fluid reservoir, said third hose line connected to the second three-way valve, a fourth hose line connected to said second three-way valve, said fourth hose line connected to a vacuum pump whereby said container and fluid reservoirs are evacuated prior to fluid entering said container from said fluid reservoir.

2. In combination, a filling and relief valve comprising a valve casing, a sleeve slidably supported within said casing, a valve head having a valve stem slidably mounted within said sleeve, spring means urging said valve head into sealing contact with said sleeve, means for limiting the travel of said valve stem to a distance shorter than the travel of said sleeve, a filling hose having a connector adapted to engage said valve casing, said connector having an inner abutment adapted to seat against the end of said sleeve to urge said sleeve out of sealing contact with said valve head when said connector is in engagement with one end of said valve casing, a container to be evacuated connected to the other end of said valve casing, and filling and relief valve means for selectively connecting said filler hose to a fluid reservoir, filling and relief valve means for selectively connecting said fluid reservoir to an evacuating device, and filling and relief valve means for selectively connecting said filler hose to an evacuating device whereby said container and said fluid reservoirs are exacuated prior to fluid entering said container from said fluid reservoir.

References Cited in the file of this patent

UNITED STATES PATENTS

| 719,772 | Fanta | Feb. 3, 1903 |
| 1,156,657 | Beam | Oct. 12, 1915 |
| 2,538,259 | Merriman | Jan. 16, 1951 |
| 2,833,301 | Argus | May 6, 1958 |

FOREIGN PATENTS

| 518,482 | Great Britain | Feb. 28, 1940 |
| 671,186 | Great Britain | Apr. 30, 1952 |